Patented June 17, 1924.

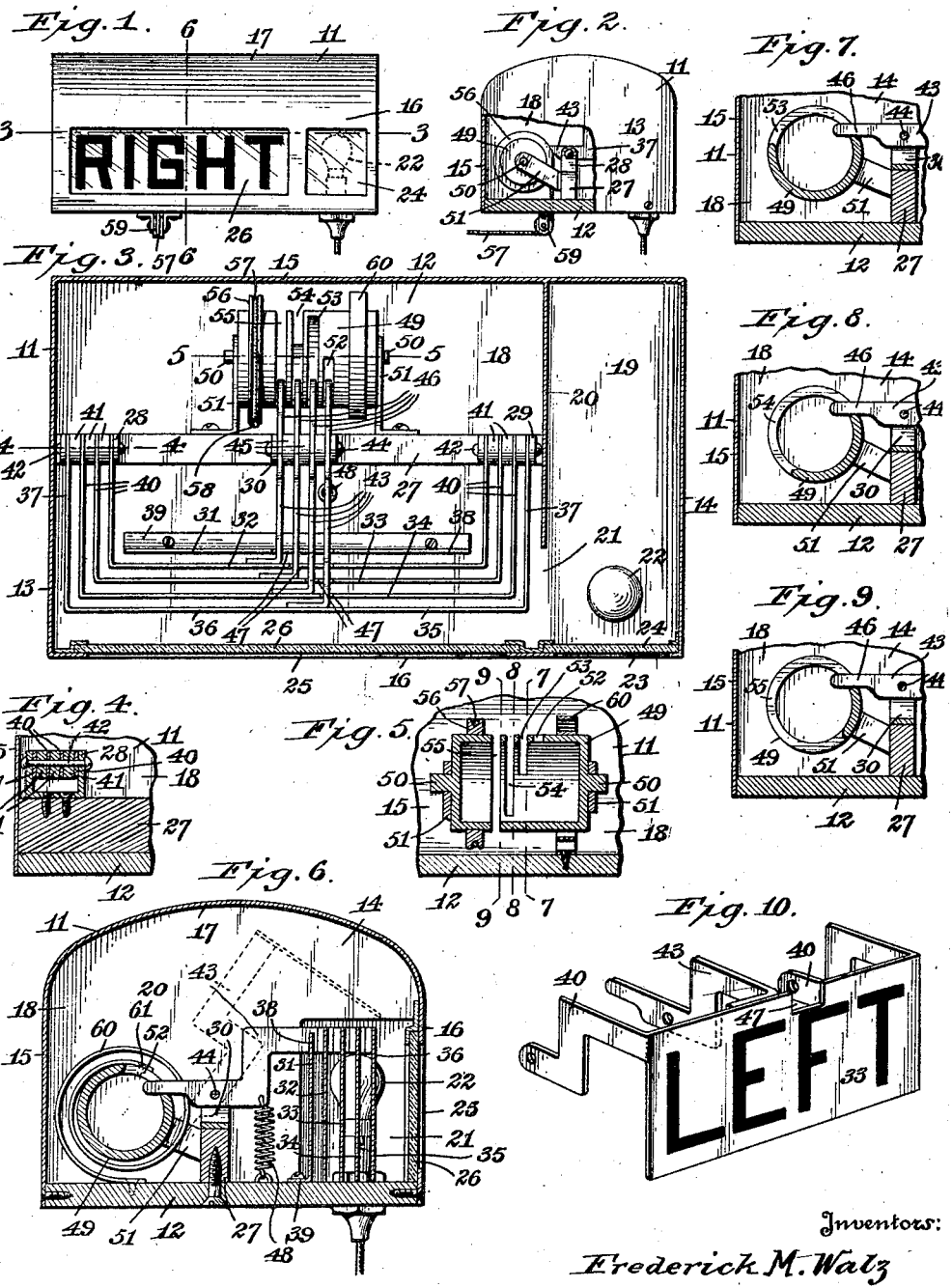

1,498,310

UNITED STATES PATENT OFFICE.

FREDERICK M. WALZ AND CHARLES J. WALZ, OF HAMBURG, NEW YORK.

AUTOMOBILE SIGNAL.

Application filed June 17, 1922. Serial No. 569,008.

*To all whom it may concern:*

Be it known that we, FREDERICK M. WALZ and CHARLES J. WALZ, citizens of the United States, residing at Hamburg, in the county of Erie and State of New York, have invented certain new and useful Improvements in Automobile Signals, of which the following is a specification.

Our invention relates to improvements in automobile signals adapted to signal vehicles in rear of the intention to continue in a straight course or deviate therefrom.

One of the objects of our invention is the provision of a signal of this kind, capable of selectively displaying one of any desired number of signaling elements to indicate caution, stop, left, right, or any other additional signals that may be desired, the construction and arrangement of parts being such that any desired number of signals or notices may be used without increasing the size of the complete signal.

Another object is to provide a signal in which a number of display or signaling elements are employed, and to so arrange the same that a number of such elements will require practically no larger space than if a single element were employed.

A further object of my invention is to provide a simple and substantial device for the purpose intended, which can be economically manufactured and by means of suitable operating mechanism leading to the driver of an automobile can be conveniently operated to selectively display the particular signal or notice desired.

With the above and other objects to appear hereinafter, the invention consists in the novel features of construction and in the arrangement and combination of parts to be hereinafter described and more particularly pointed out in the subjoined claims.

In the drawings:—

Fig. 1 is a rear elevation of the signal, considered as applied to an automobile.

Fig. 2 is an end elevation of the same with part of the end wall broken away to illustrate parts within the casing.

Fig. 3 is an enlarged horizontal section taken on line 3—3, Fig. 1.

Fig. 4 is a longitudinal section taken on line 4—4, Fig. 3.

Fig. 5 is a longitudinal section take on line 5—5, Fig. 3.

Fig. 6 is an enlarged transverse section taken on line 6—6, Fig. 1.

Fig. 7 is a transverse section taken on line 7—7, Fig. 5.

Fig. 8 is a transverse section taken on line 8—8, Fig. 5.

Fig. 9 is an transverse section taken on line 9—9, Fig. 5.

Fig. 10 is a detached perspective view of one of the signaling elements.

Referring to the drawings in detail, the reference numeral 11 designates a casing which may be of any approved construction and formation, the form now believed to be best adapted to compactly enclose the mechanism within having a bottom 12, end walls 13, 14, a front wall 15, a rear wall 16, and a crowned top wall 17 meeting the front and rear walls by rounding the corners.

The casing is divided into two compartments 18, 19 by a transverse wall 20 having a light opening 21 therein, the compartment 18 being what may be termed the mechanism compartment and being considerably larger than the compartment 19, which latter has an incandescent electric lamp 22 therein adapted to be connected to the battery of the automobile.

The rear wall has an opening 23 formed therein, which is closed by a pane of glass 24. If desired, this glass may be of the ordinary transparent kind, as shown, or said opening may be closed with a pane of red glass and utilized as the tail lamp of the automobile. Said rear wall also has a sight opening 25 formed therein to display the signal elements therethrough, said opening being closed by a transparent pane of glass 26.

Extending from the end wall 13 to the transverse or dividing wall 20 of the casing is a supporting bar 27 secured to the bottom 12 of the casing in the manner shown ing Fig. 6, or otherwise. Fastened to this supporting bar in the manner shown in Fig. 5, are three brackets 28, 29, 30, each bracket having spaced upstanding lugs between which parts of our mechanism, to be presently described, are adapted to be pivotally retained.

In the drawings we have shown four signaling elements or members and also a shutter member adapted to conceal the signaling members from view through the sight opening 25, said shutter member and signaling members being normally alined with said sight opening. The signaling elements we have designated 31, 32, 33, and 34, while the shutter member is designated by the numeral 35. The shutter member comprises a plate 36 somewhat wider and longer than the sight opening 25 in the casing, and this plate is preferably painted black or constructed of some dark material so that when positioned in front of the glazed sight opening, the interior of the box will have the appearance of being perfectly dark. The exterior of the casing is preferably painted black so that from a distance the shutter member will appear as though part of the casing.

At opposite ends of the shutter member or plate 35, angular supporting levers 37 are extended forwardly, the front ends of which are pivotally attached between the spaced lugs and the brackets 28, 29 fastened to the upper edge of the supporting bar 27. The object of providing angular supporting levers is to position the pivots of the shutter member at low points within the casing and yet allow the use of a comparatively wide plate capable of being swung upwardly in the manner indicated by dotted lines in Fig. 6, without swinging into an extremely high position, necessitating a casing of considerable height or size. The preferred form of shutter member is one which can be constructed of sheet metal of substantial gauge with the supporting levers integral therewith and directed forwardly therefrom in a horizontal plane, thence downwardly and finally forwardly to terminate in pivot ends.

The signaling elements are arranged forward of the shutter member and are made progressively shorter, the foremost signaling element being immovable and comprising a plate 38 having a flange 39 at its lower edge adapted to bear against the bottom of the casing and be secured thereto by means of screws, or otherwise. The shutter member and signaling elements are parallel, and all signaling elements, except the rigid or fixed element 38, are provided with angular supporting levers 40 adapted to be pivotally secured within the brackets 28, 29, said levers being separated by washers 41, those at corresponding ends being pivotally secured within a bracket by a single pivot bolt 42.

From the above, it will be understood that the shutter member 35 and the signaling elements 32, 33 and 34 are pivotally arranged so that they may be swung from the position shown in full lines in Fig. 6 to that, or to a position similar to that, indicated by dotted lines in said figure; and when swung upwardly into the last-mentioned position, they cannot be seen through the glazed sight opening 25.

As stated, the shutter member is provided to conceal the signaling elements when in normal position, and each of the signal elements has an indication painted or otherwise provided thereon, such as "Caution", "Left", "Right", or "Stop". As now arranged, it is intended that the foremost or rigid signaling element 31 shall bear the word "Stop"; the signaling element 32 directly in rear and spaced therefrom the word "Right"; the signaling element 33 directly in rear of the right-indicating element the word "Left"; while the signaling element 34 between the left-indicating element and the shutter member shall bear the word "Caution", and in order to selectively display these signaling elements, the shutter member and each of the movable signaling elements has an actuating lever 43 extending forwardly and pivoted between its ends. Like the supporting levers 37, 40, respectively, at opposite ends of the shutter member and the signaling elements, these actuating levers are also of angular formation and pivotally secured to a single pivot 44 extending through the bracket 30 secured to the top of the supporting bar 27, suitable washers 45 surrounding said pivot 44 between said actuating levers to maintain the same in spaced relation. The pivots of the supporting levers 42 are alined with the pivot of the actuating levers, and in preferred construction we have designed said actuating levers so that they extend forward of the plane of their pivot and preferably terminate in narrow cam-engaging portions 46.

It is to be noted that each of the signaling elements is provided with a notch 47 at its upper edge to provide clearance for the actuating levers of the shutter member and the actuating levers of the signaling elements in rear thereof so as to pass beyond the same, thus allowing all actuating levers to be in perfect alinement without interference in action from any of the signaling elements.

In order to guard against noise, caused by the shutter member and signaling elements swinging on their pivots when traveling over rough roads, the actuating lever of the shutter member 35 has one end of a retractile spring 48 secured thereto, the other end being fastened to the bottom 12 of the casing in any suitable manner. Said spring serves to retain the lower edge of the shutter member in firm contact with the bottom of the casing, and by reason of the lower edge of said actuating lever bearing against the lower walls of the notches 47 in the pivoted signaling elements, the latter are prevented from swinging on their pivots.

For the purpose of displaying the signaling elements, actuating mechanism is provided within the casing which consists of a cam member 49 in the form of a cylinder provided with trunnions 50 at opposite ends journaled in brackets 51 extending forwardly from the supporting bar 27. This cylinder is provided with cam slots 52, 53, 54, and 55, which are of increasing length and through which the cam-engaging ends of the actuating levers 43 normally extend. When the parts are in normal position, said actuating levers are in contact with corresponding ends of the slots, which ends are in alinement at such times.

The actuating lever of the shutter member 35 extends into the shortest cam slot 52. The actuating lever of the caution-indicating element 34 extends into the cam slot 53, which is longer than the slot 52 but shorter than the slot 54. The actuating lever of the left-indicating element 33 extends through the slot 54, which is shorter than the slot 55 but longer than the slot 53, and the actuating lever of the right-indicating element 32 extends through the slot 55, which is the longest of the series of cam slots.

For the purpose of rotating the cam member or cylinder, it is provided with a grooved rim 56 in which one end of a manipulating cord 57 is secured, said cord being passed around said grooved rim and extending downwardly through an opening 58 in the bottom of the casing, thence around the pulley 59 secured to the under side of said bottom, from which it is directed forwardly to within convenient reach of the driver of the automobile, at which point suitable means may be provided for indicating, controlling, or regulating the extent to which the cord is to be drawn upon to display the desired signal through the glazed sight opening 25 of the casing.

After rotating the cam member or cylinder by means of the manipulating cord, it is necessary that said cam member or cylinder be returned to normal position, and for this purpose I provide a clock spring 60, which surrounds said cam member or cylinder, and has one end secured thereto, as at 61, and its other end secured to the bottom 12 of the casing. Said spring tends at all times to rotate said cam member or cylinder in a direction opposite to that required to operate the signaling elements and shutter member and also serves to keep corresponding ends of the slots 52, 53, 54 and 55 in engagement with the lower edges of the narrow cam-engaging ends of the actuating levers, as clearly shown in Fig. 6.

When drawing upon the manipulating cord 57, the cam member or cylinder 49 is rotated clockwise, as seen in Figs. 2 and 6, thus moving the normally engaged end walls of the cam slots away from the cam-engaging ends of the actuating levers, with the result that the opposite end of the shortest slot 52 in said cam member or cylinder will be the first to engage the upper edge of the actuating lever 43 extending forward from the shutter member, and when thus engaging said lever at a point forward of its pivot, the front portion of said lever will be moved downwardly while that portion extending rearwardly from its pivot will swing upwardly, with the result that said shutter member will be moved from the position shown in full lines in Fig. 6 to that shown in dotted lines, thereby displaying the word "Caution" on the signaling element 34.

During the time that the actuating lever of the shutter member is being swung on its pivot, the engaging ends of the remaining cam slots 53, 54, 55 move away from the actuating levers extending into said slots but said levers are not engaged by the opposite ends of said slots. However, after moving the manipulating cord 57 a distance sufficient to elevate the shutter member and display the word "Caution", the driver may continue to draw upon the manipulating cord to bring the actuating end of the next cam slot 53 into engagement with the cam-engaging end of the actuating lever 43 extending forwardly from the caution-indicating element 34, thus actuating said element in the same manner as the shutter member was actuated, with the result that the signaling element 33 will be exposed through the sight opening 25 to display the word "Left". If the rotation of the cam member or cylinder 49 is continued after elevating the caution-indicating element 34, the actuating end of the cam slot 54 will engage the cam engaging end of the actuating lever extending forwardly from the left-indicating element 33, thereby raising the same in the same manner as the plates or elements previously raised and causing the word "Right" to be displayed through the sight opening. Should the driver have in mind to inform a vehicle in rear that he intends to stop, he will continue the rotary movement of the cam member or cylinder and cause the actuating end of the cam slot 55 to engage the upper edge of the actuating end of the actuating lever extending forwardly from the right-indicating element, thus elevating the same and displaying the word "Stop" on the fixed signaling element. Owing to the fact that the shutter member and the pivoted signaling elements are all actuated while causing the cam member or cylinder to make less than a complete revolution, it is simply necessary to pull open the actuating cord 57 to the extent desired to cause one or more plates to quickly move out of sight and display the selected signal without causing any confusion. When releasing the manipulating cord, the spring 48 will immediately return the shutter member and signaling elements to their normal position, and for this purpose suitable cushioning means may be provided against which the lower edges of said member and elements may strike so as to avoid unnecessary noise.

While we have shown straight plates and angular supporting and actuating levers, these may be varied in form and other changes made from the construction and arrangement shown, without departing from our invention or sacrificing any of the advantages thereof.

Having thus described our invention, what we claim is:—

1. An automobile signal having a plurality of signaling elements arranged one in front of another, and a single manipulating element for selectively displaying the desired signaling element.

2. An automobile having a plurality of signaling elements, a shutter member for concealing said elements, and means for manipulating said shutter member and selectively displaying the desired signaling element, said means including a single manipulating element.

3. An automobile signal comprising a casing having a sight opening, a shutter member normally closing said opening, a plurality of signaling elements concealed by said shutter member, and means for actuating said shutter member and displaying any one of said signaling elements.

4. An automobile signal, comprising a casing having a sight-opening, a shutter member for said sight opening, a plurality of signaling elements normally concealed by said shutter member, and means for moving said shutter member and successively moving said signaling elements.

5. An automobile signal comprising a casing having a sight opening, a plurality of spaced signaling elements arranged parallel, a single actuating member in operative relation to all of said signaling elements, and a manipulating element for manipulating said actuating member.

6. An automobile signal comprising a casing having a sight opening, a plurality of signaling elements adapted to be displayed through said sight opening, an actuating member in operative relation to said signaling members for actuating the same, each during portion of the movement of said actuating member, and a single element for moving said actuating member to any desired extent.

7. An automobile signal comprising a casing having a sight opening, a plurality of signaling elements adapted to be displayed successively through said sight opening, an actuating member having cam elements, the first of which is movable independent of the other, each cam element being operatively related to one of said signaling elements, and means for moving said actuating member.

8. An automobile signal comprising a casing having a sight opening, a plurality of signaling elements normally in line with said opening and arranged for movement consecutively, means for directing rays of light against said signaling elements, and means for selectively displaying said signaling elements.

9. An automobile signal comprising a casing divided into two compartments and having a glazed opening in each compartment, a lamp in one of said compartments, a plurality of signaling elements in the other compartment against which the rays of light from said lamp are directed, and means for selectively displaying said signaling elements through the glazed opening in said last-mentioned compartment.

10. An automobile signal having a casing divided by a wall into two compartments and having a glazed opening in each compartment, said wall having a light opening therethrough, a lamp in one of said compartments adjacent said light opening and the glazed opening therein, a plurality of signaling elements in the other compartment in line with said light opening and adapted to be selectively displayed through the glazed opening in said last-mentioned compartment, and means operatively related to said signaling elements for operating the same.

11. An automobile signal comprising a plurality of plates having levers at opposite ends pivotally secured, an actuating lever extending from each of said plates from a point approximately midlength thereof, and a cam member adapted to successively actuate each of said actuating levers.

12. An automobile signal comprising a casing having a sight opening, a series of pivoted signaling members arranged one in rear of the other, an actuating lever for each signaling element pivotally secured between its ends, a cam member adapted to engage each of said actuating levers, and means for rotating said cam member.

13. An automobile signal comprising a casing having a sight opening, a plurality of signaling plates arranged one in rear of the other and provided with angular levers pivotally secured at a low point, each plate having an angular actuating lever pivotally secured, a rotatable member provided with cam elements of different range adapted for causing successive actuation of said angular actuating levers, and means for rotating said rotatable member any desired portion of a revolution.

14. An automobile signal comprising a casing having a sight opening, a plurality of signal plates arranged one in rear of the other and having forwardly-extending levers at opposite ends pivotally secured on one axis, forwardly extending actuating levers on said plates pivotally secured between their ends in alinement with the pivots of said first-mentioned levers, a cylinder provided with slots of different lengths, each adapted to receive one of said actuating levers, means for rotating said cylinder, and means for returning said cylinder to normal position.

15. An automobile signal comprising a casing having a sight opening, a signaling element in fixed position within said casing forward of said sight opening, a plurality of movable signaling elements between said fixed signaling element and said sight opening having forwardly-extending levers at opposite ends pivotally secured at their forward ends with the pivots of all of said levers in alinement, actuating levers secured to said movable signaling elements between their ends and extending forwardly therefrom, said actuating levers being pivotally secured between their ends in alinement with said first-mentioned levers, a rotatable cam member having slots of different lengths extending therethrough into which the forward ends of said actuating levers extend, a manipulating cord secured to and wound around said rotatable cam member, and means for returning said movable signal elements to normal position after being actuated.

16. In an automobile signal, a plurality of movable signaling elements having parts projecting therefrom, a rotatable cylinder provided with cam slots extending partly around the same and of different lengths, the projecting parts of said signaling elements normally bearing against corresponding ends of said cam slots and adapted to be successively engaged by the opposite ends of said slots to successively actuate said signaling elements, and means for rotating said cylinders.

17. An automobile signal comprising a casing having a sight opening, a plurality of signaling plates arranged one in rear of another and normally in line with said sight opening, said plates being provided with angular actuating levers pivotally secured, springs connected to said levers to retain said plates in normal position and to return the same to normal position after being actuated, and means for successively actuating said signaling plates.

18. An automobile signal comprising a plurality of pivoted signaling elements having parts projecting therefrom, a rotatable member provided with cam elements adapted to engage said projecting parts at different portions of the revolution of said rotatable member, means for rotating said member to any desired extent, and a clock spring surrounding said rotatable member and fastened with one end thereto and with its other end to a fixed point to cause said rotatable member to be returned to normal position after being actuated.

In testimony whereof we affix our signatures.

FREDERICK M. WALZ.
CHARLES J. WALZ.